Figure 1:
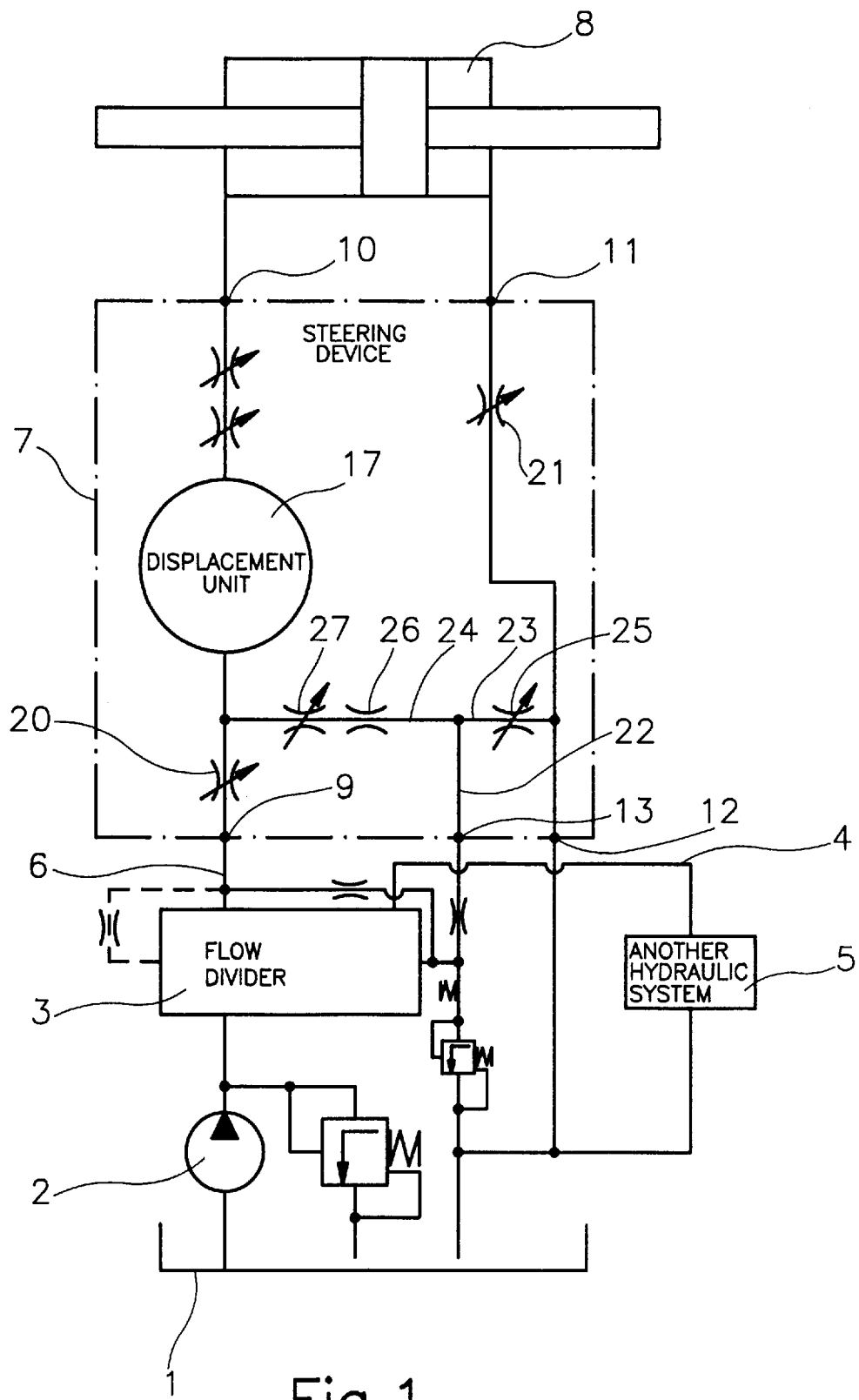

United States Patent

Bergmann et al.

[11] Patent Number: 5,771,692
[45] Date of Patent: Jun. 30, 1998

[54] HYDRAULIC STEERING UNIT WITH LOAD SIGNAL

[76] Inventors: Erhard Bergmann, Kiekut 12, 19079 Mirow; Manfred Schildmann, Gescw.-Scholl-Strasse 30; Gerhard Voss, Karl-Liebknecht-Strasse 9, both of 19370 Parchim, all of Germany

[21] Appl. No.: 718,488
[22] PCT Filed: Mar. 23, 1995
[86] PCT No.: PCT/DE95/00393
   § 371 Date: Sep. 27, 1996
   § 102(e) Date: Sep. 27, 1996
[87] PCT Pub. No.: WO95/26292
   PCT Pub. Date: Oct. 5, 1995

[30] Foreign Application Priority Data

Mar. 28, 1994 [DE] Germany .................... 44 10 693.9

[51] Int. Cl.⁶ ..................................................... F16D 31/02
[52] U.S. Cl. ............................................... 60/384; 60/387
[58] Field of Search ............................... 60/384, 387, 388

[56] References Cited

U.S. PATENT DOCUMENTS

Re. 25,126  2/1962  Charison .
4,096,883   6/1978  Yip .............................................. 60/384
4,665,695   5/1987  Rau et al. ................................... 60/384
4,759,182   7/1988  Haarstad ..................................... 60/384
4,838,314   6/1989  Gage ........................................... 60/384

FOREIGN PATENT DOCUMENTS 0096963  1/1983  European Pat. Off. .
0187682  7/1986  European Pat. Off. .
2014096  8/1979  United Kingdom .
2034646  6/1980  United Kingdom .

*Primary Examiner*—F. Daniel Lopez

[57] ABSTRACT

A steering system having a first auxiliary branch line (23, 24) connecting a main line (6) to a return port (12); with a load line (22) connecting the first auxiliary branch line to a load port (13) and dividing the first auxiliary branch line into first (24) and second (23) flow paths. The main line includes an adjustable input throttle (20). The first flow path (24) includes an adjustable load throttle (27) and a second throttle (26) in series. The adjustable input throttle and the adjustable load throttle act in a same direction. The purpose of this control circuit is to raise the load port pressure level, so as to prevent relatively high power losses.

8 Claims, 6 Drawing Sheets

HYDRAULIC STEERING UNIT WITH LOAD SIGNAL

A steering device is described in the British Printed Patent Document GB-A-2014096, which steering device does not exhibit this disadvantage. For this purpose, this steering device is furnished with an auxiliary, secondary line, which branches off from the main line downstream of the adjustable input throttle and which leads through a load-signal throttle to the discharge connector. In addition, two adjustable throttles are disposed in parallel arrangement in this auxiliary, secondary line. The two throttles are closed in the neutral position, and the two throttles are opened with the adjustable input throttle in the same direction. One of the two throttles closes in case of a certain deflection angle, whereas the second throttle remains opened. Since the two throttles are operating synchronously over the complete deflection region, the opening characteristics of the two throttles have to be precisely coordinated to each other. These production requirements are therefore very high and associated with substantial cost and cannot be realized under the conditions of series production such that it leads to an undefinable steering behavior of the individual steering devices. Such behavior is not acceptable in connection with these devices.

The invention relates to a hydraulic steering device employed in mobile plants, which include a steering circuit and a work circuit and where both the steering circuit and the work circuit are supplied by a common pump, wherein the steering circuit is furnished with priority.

Such plants comprise mainly a common supply pump and a flow divider valve, as well as a steering device and a steering cylinder on the one hand and a work circuit on the other hand. The flow divider valve is provided as a spring-loaded valve and receives its control signal as a so-called load signal from the hydraulic steering device. According to this load signal, the flow divider valve automatically controls its passage flow cross-sections in such a way that the steering circuit is supplied with precedence and according to need and that the work circuit is supplied with the excessive compression oil. It is known to condition the load signal statically or dynamically. Based on the high reaction capability of a dynamic load signal, this kind of conditioning predominates more and more in practice.

For example, a steering device with the dynamic load signal is known from the European Patent 0 096 963. This steering device is furnished with a load-signal path, which branches off from the main current flow line from the steering device and is led, on the one hand, to the spring-loaded side of the flow divider valve and, on the other hand, to a separate connection of the steering device; wherein the load-signal path joins again to the main current flow line within the steering device after the first adjustable throttle, and leads from there simultaneously to the return line. In the part of the load-signal path, leading to the return line, there is disposed an adjustment throttle, operating proportional inversely to the first adjustable throttle and actuatable by the steering device. This steering device is associated with the disadvantage that, even in case of high steering speeds and thus high flow volumes, there is required an automatic control spring with a relatively high spring stiffness level for maintaining a preferred and required supply of the steering aggregate. One always has to work against this strong automatic control spring in the neutral position, i.e. in case of a non-actuated steering device, in order to supply the work circuit. This requires high energy losses and high power losses of the hydraulic plant.

It is the object to raise the load-signal pressure level to meet the requirement in connection with steering devices of the recited kind.

The steering device according to the invention contributes to the improvement of the energy balance of the hydraulic plants of this kind. The application of a weaker, the load-signal-supporting pressure spring becomes possible with the increase, meeting the requirement, of the pressure difference between the two pressure signals, acting on the flow divider valve, in favor of the load signal. A substantial part of the power of the supply pump is thereby made available for the working hydraulics, which up to now was required for the switching of the flow divider valve.

The invention is to be further explained in the following by way of an embodiment.

Figure 2:
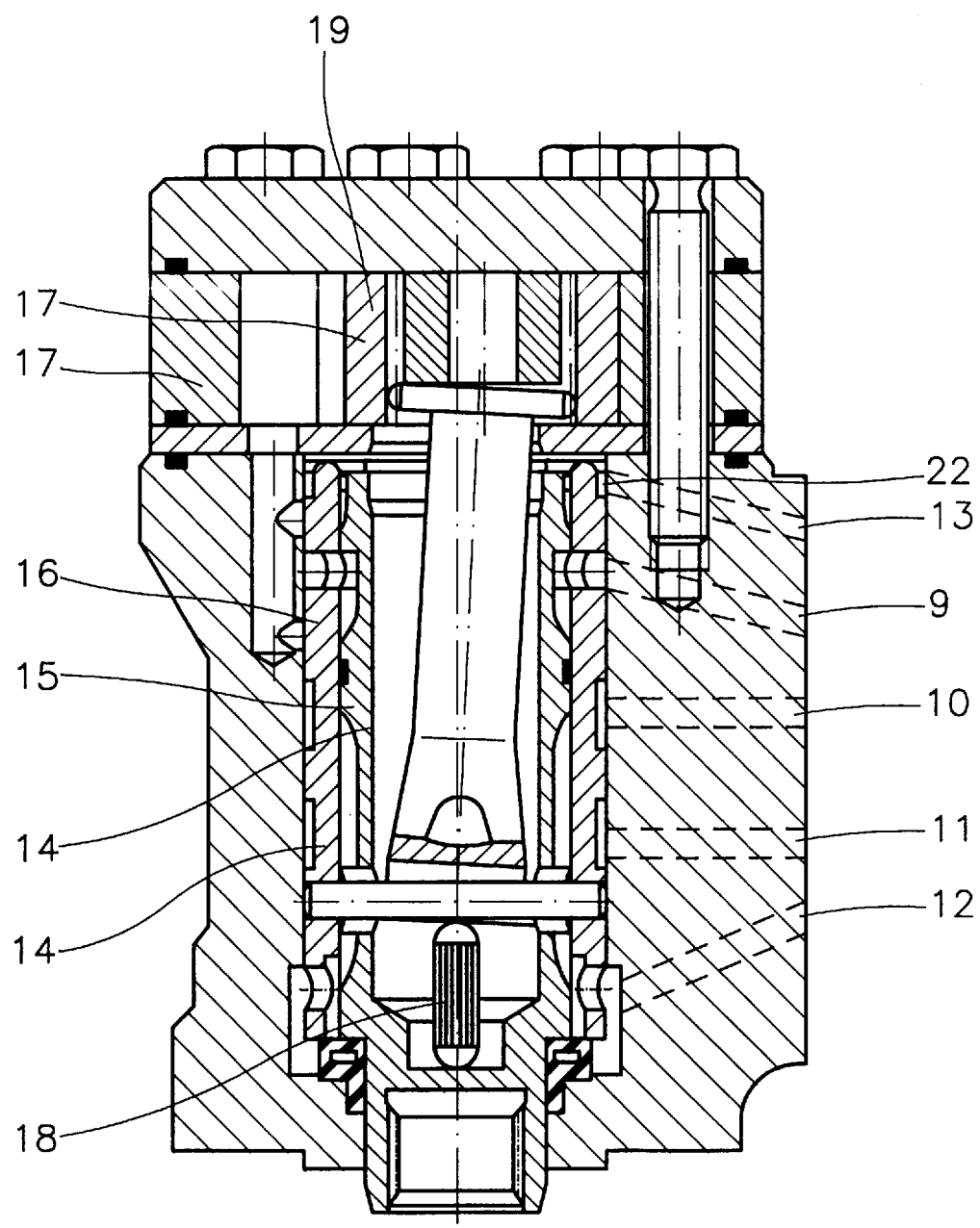
Figure 3:
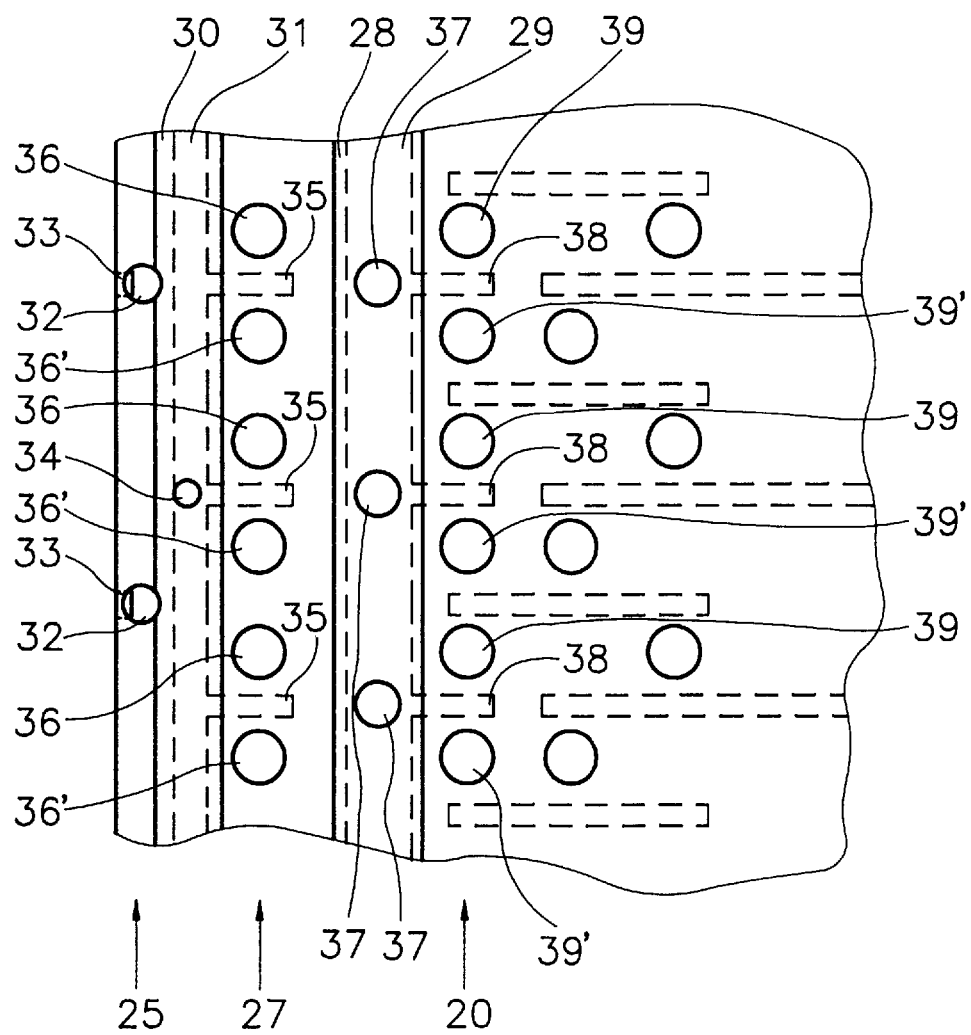
Figure 4:
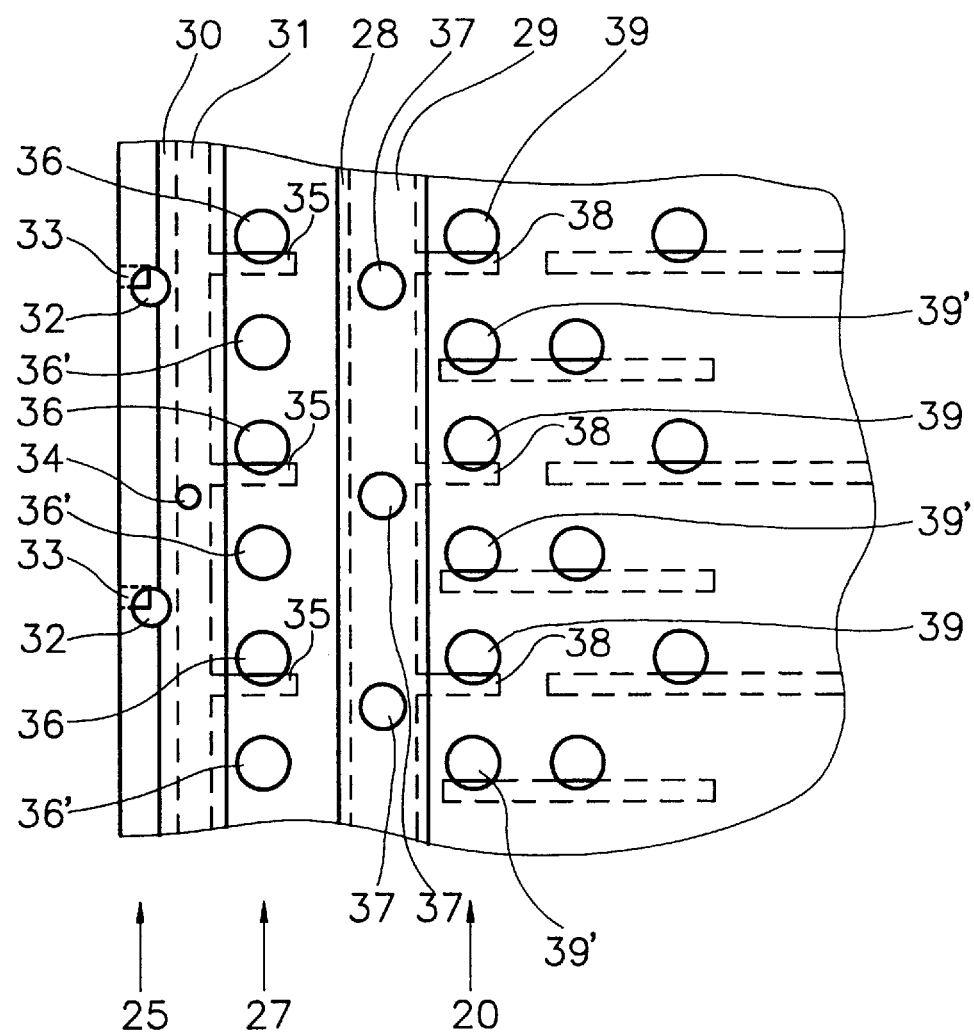
Figure 5:
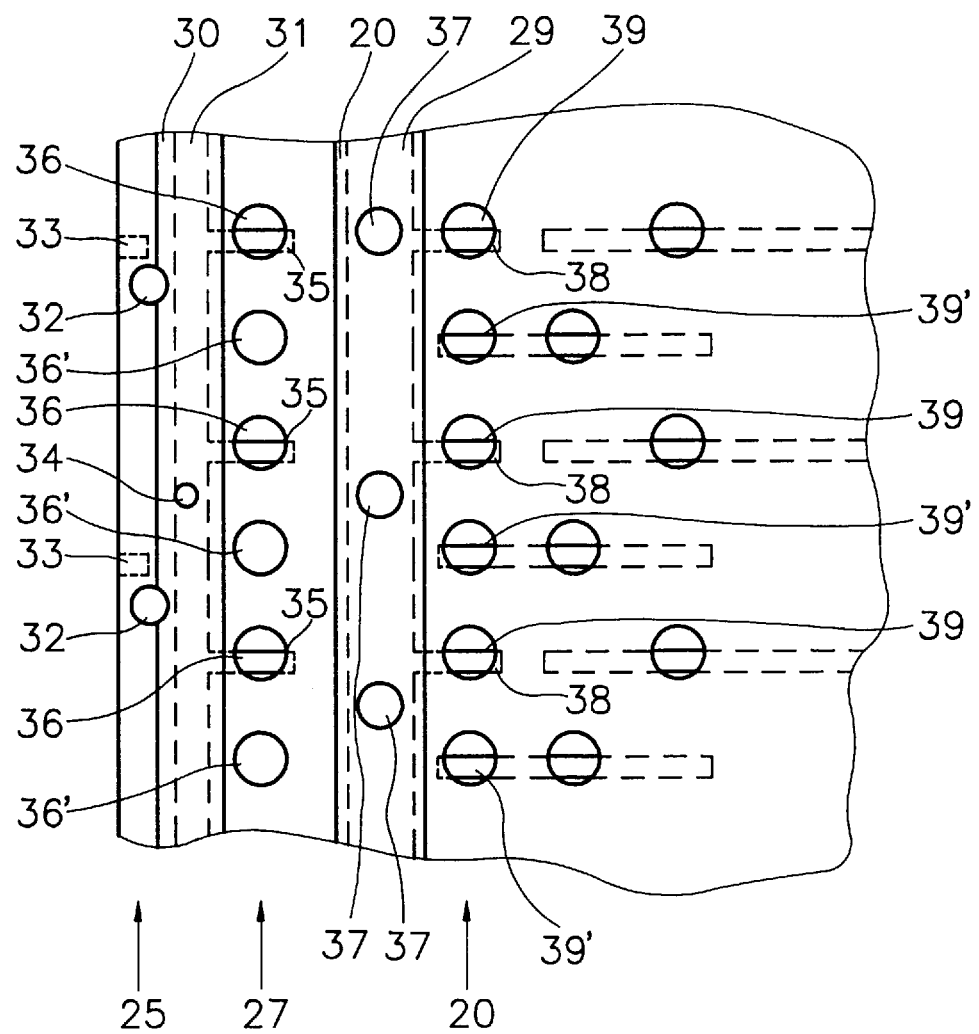
Figure 6:
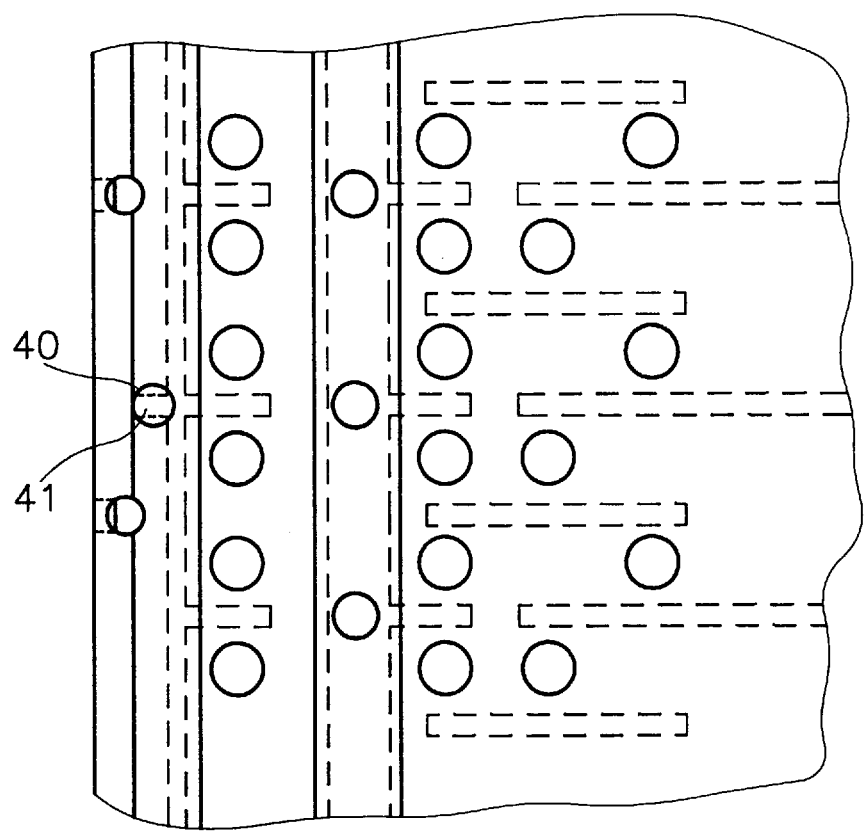

There is shown in:

FIG. 1: a steering circuit and a work circuit with a common supply pump,

FIG. 2: a sectional view through a steering device,

FIG. 3: a developed view of the control valve of the steering device in a neutral position, FIG. 4: a developed view of the control valve of the steering device with a slight deflection, FIG. 5: a developed view of the control valve of the steering device with a largest deflection, and FIG. 6: a developed view of the control valve of the steering device in neutral position with a different embodiment of the throttle.

The circuit according to FIG. 1 is composed of a steering circuit and a work circuit and comprises common elements, a tank 1, a continuously feeding supply pump 2 and a flow divider valve 3. A feed line 4 for a working hydraulics 5 and a feed line 6 for a steering device 7 branch off from the flow divider valve 3. A steering cylinder 8 is disposed downstream of the steering device 7. The steering device 7 is furnished with a feed connector 9 connected to the flow divider valve 3, two cylinder connectors 10 and 11 for the steering cylinder 8, one return connector 12 connected to the tank 1, as well as a load-signal connector 13, wherein the load-signal connector 13 is connected through throttles to the spring-loaded side of the flow divider valve 3 and to the feed line 6 of the steering device 7.

As is also shown in FIG. 2, the steering device 7 mainly includes a control unit 14 with an internal control piston 15, and an outer control sleeve 16, and a displacement unit 17, operating according to the Gerotor principle. The control piston 15 and the control sleeve 16 have communicating axial and radial channels with each other and with the displacement unit 17, and both the control piston 15 and the control sleeve 16 are rotatable relative to each other against the force of a spring 18 over a limited angle region.

The control sleeve 16 is mechanically connected to the rotor 19 of the displacement unit 17.

An adjustable input throttle 20 is disposed in the main line upstream in front of the displacement unit 17 in the control unit 14 and an adjustable output throttle 21 is disposed downstream of the steering cylinder 8 in the control unit 14. Furthermore, a current flow path 22 for the load signal is disposed in the control unit 14, wherein the current flow path 22 starts in the load-signal connector 13 and subdivides into a first path 23 with connection to the return connector 12, and into a second path 24, with connection to the main line downstream of the adjustable input throttle 20. A first adjustable load-signal throttle 25 is disposed in the first path 23, and a throttle 26 and a second adjustable load-signal throttle 27 are in series disposed in the second path 24. The throttle 26 can be furnished as a constant flow throttle or as an adjustable throttle. The adjustable throttles 20, 25, and 27 are constructed with respect to their closure characteristics such that the first adjustable load-signal throttle 25 and the adjustable input throttle 20 close in a relative opposite direction and the second adjustable load-signal throttle 27 and the adjustable input throttle 20 close in the same direction. Depending on the application case, it is possible to provide a construction, wherein the opening motion or, respectively, the closing motion of the recited adjustable throttles is realized staggered with respect to time.

The constructive embodiment of the throttles 20, 25, 26, and 27 can be recognized from FIGS. 3 through 6. In this context, the control sleeve 16 is illustrated by solid lines and the control piston 15 disposed below is illustrated by dotted lines.

An annular channel 28 of the control sleeve 16 and an annular channel 29 of the control piston 15 for the input current flow as well as an annular channel 30 of the control sleeve 16, and an annular channel 31 of the control piston 15 for the load-signal current flow are in each case disposed in superposition and are in register. Radial boreholes 32 of the control sleeve 16 with connection to the annular channel 30 and correspondingly disposed slots 33 in the control piston 15 with connection to the interior space of the control unit 14 form the first adjustable load-signal throttle 25. One or several radial boreholes 34 with defined cross-section in the region of the annular channel 30 of the control sleeve 16 with connection to the annular channel 31 of the control piston 15 form the throttle 26 with constant cross-section. Several distributedly arranged axial slots 35, having a limited length, extend from this annular channel 31 of the control piston 15, wherein radial boreholes 36 and 36' are disposed on two sides of the longitudinal region of the slots 35, and wherein the slots are negatively superpositioned or are not in register relative to the boreholes 36 and 36'. The slots 35 and the boreholes 36 and 36' form the second adjustable load-signal throttle 27. The annular channel 28 of the control sleeve 16 for the input current flow is connected through several radial boreholes 37, distributed uniformly at the circumference of the annular channel 28, to the annular channel 29 of the control piston 15. This annular channel 29 is again furnished with axial slots 38 of limited length. Again, these slots 38 are negatively superpositioned or are not in register relative to radial boreholes 39 and 39' of the control sleeve 16 disposed on two sides of the slots 38, and form together the adjustable input throttle 20.

FIG. 6 shows a particular embodiment, wherein the throttle 26 is furnished also as an adjustable throttle. For this purpose, a radial borehole 40 is disposed in the annular channel 30 of the control sleeve 16 in such way that the borehole 40 in the neutral position of the control unit 14 is positively superpositioned or in register with an axial slot 41 of the control piston 15. This slot 41 is connected to the annular channel 31 of the control piston 15.

The adjustable input throttle 20 is closed in the neutral position of the steering unit 14, since the axial slots 38 of the control piston 15 are not superpositioned or not in register with one of the radial boreholes 39 or 39' of the control sleeve 16. Based on the equidirected or unidirected closure characteristics, the second adjustable load-signal throttle 27 is also closed, because the slots 35 are not in connection with the boreholes 36 or 36'. In contrast, the boreholes 32 of the control sleeve 16 are superpositioned or in register with the slots 33 of the control piston 15 such that the first adjustable load-signal throttle 25 is open.

The oil, made available by the supply pump 2, builds up a pressure in the feed line 6 in front of the steering device 7, where the pressure propagates on the one hand as pressure signal to the side of the flow divider valve 3 not loaded by a spring. On the other hand, a load-signal current flow branches off from the same position of the feed line 6, wherein the load-signal current flow is led to the spring-loaded side of the flow divider valve 3 and to the load-signal connector 13 of the steering device 7. The oil passes on a short path to the discharge connector 12 leading to the tank through the current flow path 22 and through the opened adjustable load-signal throttle 25 in the first path 23.

In the current flow path 22 and thus at the spring-loaded side of the flow divider valve 3 there is brought about a pressure level which is lower than the pressure signal present on the other side. These pressure ratios at the flow divider valve 3 cause a shifting of the automatic slider in the flow divider valve 3 into the position, where the complete oil stream is assured through the flow divider valve 3 to the working hydraulics 5 less the load-signal current flow flowing to the load-signal connector 13.

The slots 38 and the boreholes 39 come to be superpositioned or in register upon deflection of the control piston 15, for example, to the right side in case of a low rotational speed, which opens the adjustable input throttle 20. In addition, the second adjustable load-signal throttle 27 is opened when the slots 35 and the boreholes 36 are superpositioned or in register. In contrast, the boreholes 32 and the slots 33 are in the closure motion, however still superpositioned. Thus, the first adjustable load signal throttle 25 is also in open position. The oil, made available by the supply pump 2, passes through the flow divider valve 3 through the feed line 6 to the feed connector 9 and from the feed connector 9 through the opened adjustable input throttle 20 to the displacement unit 17. The oil is metered in the displacement unit 17 and is made available to the steering cylinder 8. At the same time, a load-signal current flow flows from the feed line 6 to the load-signal connector 13. A part current flow passes from the load-signal connector 13 through the first adjustable load-signal throttle 25 in the first path 23 into the tank 1 and through the throttle 26 and the second adjustable load-signal throttle 27 in the second path 24 into the main current flow leading to the displacement unit 17.

The thus generated pressure ratios at the flow divider valve 3 assure a position of the automatic control slider, where the automatic control slider subdivides the oil current flow delivered by the supply pump 2. The oil volume not required by the steering device 7 is made available to the working hydraulics 5.

Upon complete deflection of the control valve 14, for example, toward the right side, the adjustable input throttle 20 and the second adjustable load-signal throttle 27 are completely opened and the first adjustable load-signal throttle 25 is completely closed. The load-signal current flow branching from the main current flow is again returned to the main current flow within the steering unit 7 through the throttle 26 and the second adjustable load-signal throttle 27. In this process, a predeterminable, relatively high banking-up pressure is generated in front of the throttle 26, which acts as an amplified load signal onto the spring-loaded side of the flow divider valve 3. This load signal, increased relative to a circuit without throttle 26, needs only to be supported by a spring of smaller stiffness.

In case of an adjustable embodiment of the throttle 26, the cross-section of the flow, in case of a full deflection of the control piston 15, would be the smallest and, thus, the pressure of the load signal would be the largest. The pressure medium of the load signal thus is influenced depending on the rotational speed.

We claim:
1. A hydraulic steering device with a load signal, comprising a control unit with an internal control piston and an outer control sleeve, which are both furnished with radial and axial channels for communicating said radial and axial channels with each other and for communicating said radial and axial channels with a displacement unit;
  wherein said channels form a main line connected between an input connector and said displacement unit, with an adjustable input throttle disposed in the main line; and said channels form a first auxiliary branch line connected between said main line, downstream of said adjustable input throttle, and a return connector;
  wherein a second auxiliary branch line is connected between said main line, upstream of said adjustable input throttle, and a load-signal connector; said second auxiliary branch line being a part of a current flow path, which is joined to said first auxiliary branch line, subdividing said first auxiliary branch line into a first path and into a second path; and
  wherein a first adjustable load-signal throttle is disposed in said first path and a second adjustable load-signal throttle and a third throttle are disposed, in series, in said second path; wherein said adjustable input throttle is opened as said first adjustable load-signal throttle is closed.

2. A hydraulic steering device with a load signal, comprising a control unit with an internal control piston and an outer control sleeve, which are both furnished with radial and axial channels for communicating said radial and axial channels with each other and for communicating said radial and axial channels with a displacement unit;
  wherein said channels form a main line connected between an input connector and said displacement unit, with an adjustable input throttle disposed in the main line; and said channels form a first auxiliary branch line connected between said main line, downstream of said adjustable input throttle, and a return connector;
  wherein a second auxiliary branch line is connected between said main line, upstream of said adjustable input throttle, and a load-signal connector, said second auxiliary branch line being outside of said steering device and being connected to said first auxiliary branch line, subdividing said first auxiliary branch line into a first path and a second path; and
  wherein a first adjustable load-signal throttle is disposed in said first path and a second adjustable load-signal throttle and a third throttle are disposed, in series, in said second path; wherein said adjustable input throttle is opened as said first adjustable load-signal throttle is closed.

3. Hydraulic steering device according to claim 2, characterized in that said third throttle is formed as a constant throttle.

4. A hydraulic steering device according to claim 2, characterized in that said third throttle is formed by at least one radial borehole in said control sleeve, which is connected with an annular channel of the control piston.

5. A hydraulic steering device according to claim 2, characterized in that said third throttle is formed by a variable overlap between at least one radial borehole in said control sleeve and an axial slot, having a limited length, and being connected to an annular channel of the control piston; wherein said at least one borehole and said slot completely overlap when said slot overlap a predetermined residual amount when said control unit is in a maximum deflection position.

6. A hydraulic steering device according to claim 2, characterized in that said second adjustable throttle is formed by a variable overlap between several slots and several radial boreholes; wherein said slots have a limited length, are uniformly distributed around a circumference of said control piston and are connected to an annular channel of said control piston; said radial boreholes are disposed in said control sleeve; and said radial boreholes do not overlap said slots when said control unit is in a neutral position.

7. A hydraulic steering device with a load signal, comprising a control unit with an internal control piston and an outer control sleeve, which are both furnished with radial and axial channels for communicating said radial and axial channels with each other and for communicating said radial and axial channels with a displacement unit;
  wherein said channels form a main line connected between an input connector and said displacement unit, with an adjustable input throttle disposed in the main line; and said channels form a first auxiliary branch line connected between said main line, downstream of said adjustable input throttle, and a return connector;
  wherein a second auxiliary branch line is connected between said main line, upstream of said adjustable input throttle, and a load-signal connector; said second auxiliary branch line being a part of a current flow path, which is joined to said first auxiliary branch line, subdividing said first auxiliary branch line into a first path and into a second path; and
  wherein a first adjustable load-signal throttle is disposed in said first path and a second adjustable load-signal throttle and a third throttle are disposed, in series, in said second path; wherein said adjustable input throttle is opened as said first adjustable load-signal throttle is closed, wherein the second adjustable load-signal throttle and the adjustable input throttle exhibit a uni-directional closure characteristic.

8. A hydraulic steering device with a load signal, comprising a control unit with an internal control piston and an outer control sleeve, which are both furnished with radial and axial channels for communicating said radial and axial channels with each other and for communicating said radial and axial channels with a displacement unit;
  wherein said channels form a main line connected between an input connector and said displacement unit, with an adjustable input throttle disposed in the main line; and said channels form a first auxiliary branch line connected between said main line, downstream of said adjustable input throttle, and a return connector;
  wherein a second auxiliary branch line is connected between said main line, upstream of said adjustable input throttle, and a load-signal connector, said second auxiliary branch line being outside of said steering device and being connected to said first auxiliary branch line, subdividing said first auxiliary branch line into a first path and a second path; and
  wherein a first adjustable load-signal throttle is disposed in said first path and a second adjustable load-signal throttle and a third throttle are disposed, in series, in said second path; wherein said adjustable input throttle is opened as said first adjustable load-signal throttle is closed, wherein the second adjustable load-signal throttle and the adjustable input throttle exhibit a uni-directional closure characteristic.

* * * * *